2,997,375
PLASTICIZED AMMONIUM PERCHLORATE-POLYVINYL CHLORIDE PROPELLANT COMPOSITIONS
Keith E. Rumbel, Falls Church, Va., and Melvin Cohen, Washington, D.C., assignors to Atlantic Research Corporation, Alexandria, Va., a corporation of Virginia
Filed July 13, 1953, Ser. No. 367,420
8 Claims. (Cl. 52—.5)

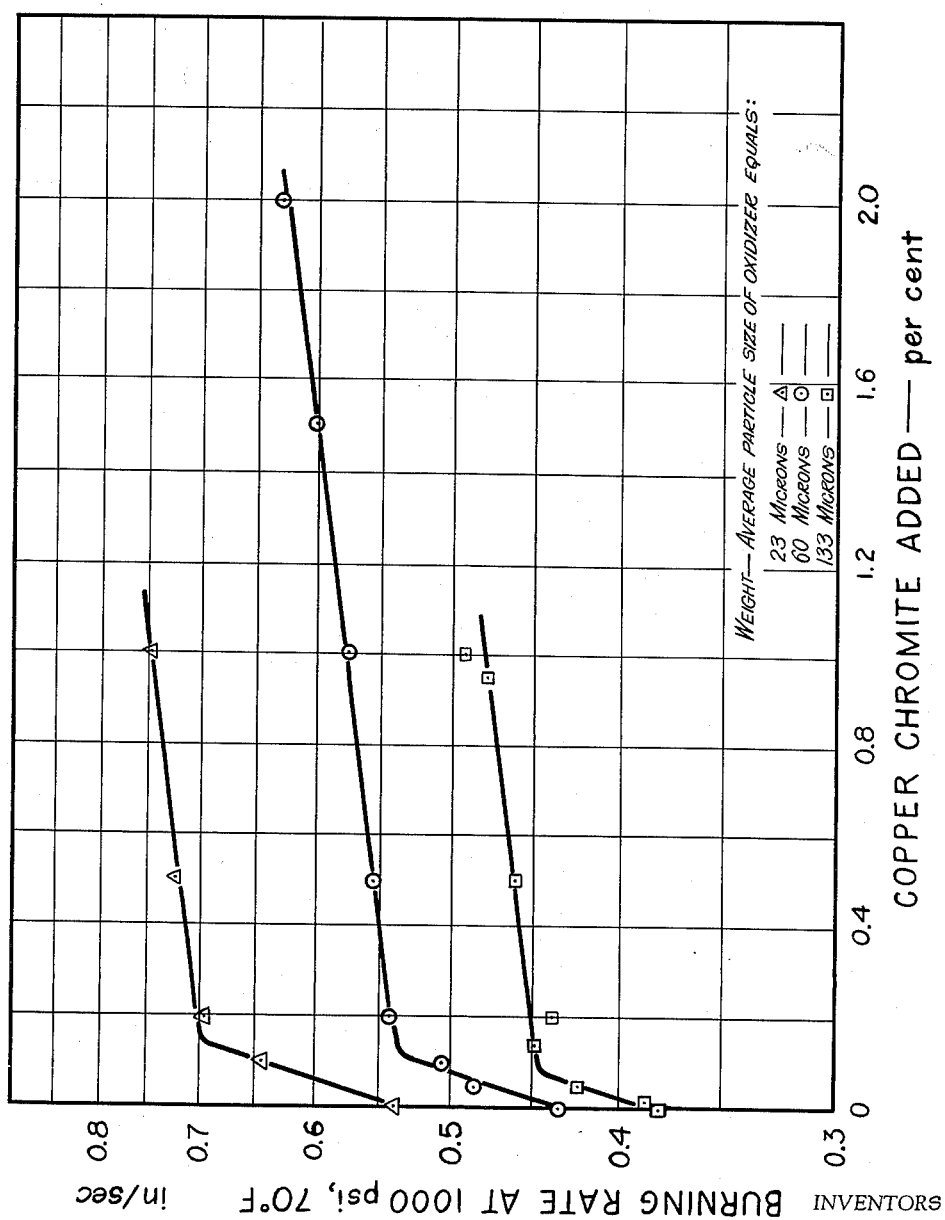

This invention relates to improved propellant compositions.

The object of this invention is to provide propellants comprising polyvinyl chloride, a plasticizer and ammonium perchlorate, which are characterized by increased burning rates and reduced pressure exponents.

Other objects and advantages of our invention will become obvious from the following description.

In the drawing, the graph shows the effect of copper chromite on the burning rate of polyvinyl chloride propellants.

The polyvinyl chloride propellant compositions are solid, rubbery gels comprising a solution of polyvinyl chloride or a copolymer of polyvinyl chloride and polyvinyl acetate, of which the polyvinyl chloride comprises at least about 90%, in an organic plasticizer. Such propellants are disclosed in Weil application Serial Number 183,457, now Patent No. 2,966,403, issued December 27, 1960. A solid oxidizer, such as ammonium perchlorate, which is insoluble in the polyvinyl chloride-plasticizer mixture, is homogeneously dispersed throughout the gel. The polyvinyl chloride and plasticizer serve as fuel and binder in the propellant composition. The plasticizer should be one which dissolves the polyvinyl chloride very slowly at room temperature and rapidly at elevated temperatures. Examples of plasticizers which are suitable for the purpose include sebacates such as dibutyl sebacate and dioctyl sebacate, phthalates such as dioctyl phthalate, dibutyl phthalate and di-(methoxyethyl)-phthalate, adipates such as dioctyl adipate and di-(3,5,5-trimethylhexyl)-adipate, glycol esters of higher fatty acids and the like.

Such propellants may be prepared by admixing finely divided polyvinyl chloride with the plasticizer to form a fluid slurry, dispersing the finely divided oxidizer in the slurry, pouring the mixture into molds and casting by heating the mixture to the temperature at which the polyvinyl chloride dissolves in the plasticizer. To permit pouring of the mix, it is desirable to employ sufficient plasticizer to retain fluidity of the slurry after incorporation of the solid polyvinyl chloride and oxidizer components. Upon cooling, the mixture sets into a solid, rubbery gel having superior characteristics for use as propellants. In general, to obtain the desired physical characteristics in the propellant grains, the polyvinyl chloride is desirably present in a ratio of about 2 parts to about 3 parts of plasticizer and, preferably, in a ratio of about 1 to 1.

The amount of oxidizer added, for many purposes, is desirably sufficient to oxidize substantially completely the polyvinyl chloride and plasticizer fuel, namely about 75 to 80%. By complete oxidation is meant oxidation of substantially all of the carbon and hydrogen in the fuel, as for example, to CO and $H_2O$. However, for some uses such complete oxidation by the incorporated oxidizer is not necessary and the proportion of oxidizer may be reduced, though preferably, the oxidizer is in major proportion in the composition. In general, up to about 80% of oxidizer can be incorporated into a polyvinyl chloride-plasticizer mix comprising equal amounts of these latter two components while still retaining fluidity.

The burning rate and pressure exponent properties of the propellants are good. However, for many applications, higher burning rates are desirable. A reduced pressure exponent may also be advantageous, as for example, in rocket propulsion. The pressure exponent is, in effect, the slope of the curve of burning rate versus absolute pressure on logarithmic coordinates. Its relation to burning rate and pressure is defined in the following equation:

Burning rate = constant $\times$ pressure$^n$ where $n$ is the pressure exponent. In any propellant composition having a positive pressure exponent, the burning rate increases with increasing pressure.

Where the pressure exponent $n$ is high the pressure increase for a given increase in burning rate is greater than that which occurs when the pressure exponent is low. In general, burning rates of propellants increase as the initial temperature of the unburned propellant increases. Thus, if the pressure exponent is low, there is considerably less effect of the initial temperature of the unburned propellant on the equilibrium pressure in the combustion chamber when the propellant is burned in a chamber from which the combustion products exhaust through a nozzle, as in rocket propulsion. An added advantage of a low pressure exponent is the lesser extent of pressure rise in a rocket combustion chamber should the amount of burning surface be suddenly increased as by exposure of an internal crack or void in an imperfect propellant grain. This reduces the possibility of the pressure building up beyond that which the walls of the chamber can safely withstand.

We have discovered that the addition of a small amount of a metal salt having a chromium oxide anion, namely a metallic chromate or chromite, to a polyvinyl chloride propellant composition containing ammonium perchlorate as the oxidizing agent markedly increases burning rate and lowers the pressure exponent. Such metallic chromates and chromites include, for example, the copper, iron, zinc, cadmium and magnesium derivatives.

The particular oxidizing agent employed in the propellant markedly affects the activity of the catalyst. Although highly effective when the oxidizer used is ammonium perchlorate, the catalyst is inert and, in some instances, may even depress the burning rate if the oxidizer is, for example, potassium perchlorate. However, substitution of a small proportion of the ammonium perchlorate by another oxidizer, such as potassium perchlorate, in the propellant composition does not adversely affect the activity of the catalyst.

The metallic chromites are more effective than the chromates in increasing burning rate and decreasing the pressure exponent $n$. However, the chromates produce increases in burning rate which may be entirely adequate in some instances. Of the metallic chromites the copper derivative is most effective, although the other metallic derivatives are also advantageous.

The activity of copper chromite varies to some extent depending on such factors as degree of purification and ratio of copper oxide to chromic oxide. An unleached copper chromite, namely one which presumably contains some unreacted copper oxide and chromic oxide, appears to be somewhat more efficient that the purified compound. A catalyst containing a larger proportion of copper oxide to chromic oxide is somewhat more active than one containing about equal proportions of the two oxides. The variations are relatively slight, however, the copper chromite catalyst being highly active in all forms.

The burning rate of the propellant varies to some extent with the particle size of the ammonium perchlorate as shown in the graph and Table II. The polyvinyl chloride propellant compositions employed in the tests presented in the accompanying graph comprise 12.5% polyvinyl chloride, 12.5% dibutyl sebacate and 75% ammonium perchlorate. Reducing weight-average particle size of the oxidizer at 75% concentration from about 133 microns to about 60 microns increases burning rate by 14% and to about 23 microns by 42%. The particle size of the oxidizer similarly influences the activity of the catalyst. The smaller the oxidizer particles, the more effective is the catalyst as shown in the graph and Table II. With an oxidizer particle size of about 133 microns, addition of 1% copper chromite increases burning rate by about 29%. Corresponding burning rate increases for oxidizer particles sizes of 60 microns and 23 microns are 32% and 39% respectively.

Increasing the amount of catalyst in the propellant composition raises the burning rate. The rate of increase in burning rate is most pronounced with catalyst percentages up to about 0.1 to 0.15% as shown in the graph. Above these percentages, the rate of burning rate increase becomes more gradual. In general, there is no advantage in adding more than about 2 to 3% of catalyst since beyond this point further increase in burning rate of the propellant becomes negligible and in some cases may drop somewhat below the 2% level. The small amount of catalyst required to produce optimum results is very advantageous in as much as such small quantities may be added to the polyvinyl chloride-plasticizer slurry without appreciably affecting fluidity.

Similarly, increasing the amount of added catalyst increasingly reduces the pressure exponent with the greatest rate of such reduction being accomplished by the addition of about 0.1 to 0.2%. Beyond these catalyst percentages the rate of pressure exponent decline tends to level off. This is illustrated in Table II.

EXAMPLE I 72.6 gms. of $Cu(NO_3)_2 \cdot 3H_2O$ were dissolved in 240 cc. of water. The water was heated to 70° C. and stirred to effect solution. To this solution was added a solution of 37.8 gms. of $(NH_4)_2Cr_2O_7$ dissolved in 180 cc. water with 45 cc. of 28% $NH_4OH$ added. On mixing the two solutions, a precipitate formed and settled out. The mixture was filtered on a Buchner funnel and the precipitate, neutral ammonium copper chromate, was dried at 110° C. A portion of the dried product was strongly heated in a crucible and was converted to neutral copper chromite. A portion of the copper chromite was leached with dilute acetic acid twice and then dried. The ratio of copper oxide to chromic oxide in these compounds was approximately 1 to 1. The three products were each tested to determine the catalytic effect on the burning rate and the pressure exponent of the polyvinyl chloride propellants. The results are given in Table I.

EXAMPLE II

In 100 cc. water were dissolved 4.6 gms. of $Cd(NO_3)_2 \cdot 3H_2O$, 4.8 gms. of $Cu(NO_3)_2 \cdot 3H_2O$ and 47.4 gms. $ZnSO_4 \cdot 7H_2O$. In another beaker, 25.2 gms. of $(NH_4)_2Cr_2O_7$ were dissolved in 100 cc. water containing 15 cc. of 28% $NH_4OH$. The two solutions were mixed, whereupon a precipitate settled out. The mixture was neutralized with $NH_4OH$. The precipitate was washed four times by decantation. The slurry was then filtered on a Buchner funnel and dried at 110° C. A portion of the resulting ammonium salt of copper-cadmium-zinc chromate was then decomposed by heating in a crucible to form copper-cadmium-zinc chromite. Both the ammonium salt of copper-cadmium-zinc chromate and the copper-cadmium-zinc chromite were tested as catalysts. The results are given in Table I.

EXAMPLE III 127 gms. of $Cu(NO_3)_2 \cdot 3H_2O$ were dissolved in water and mixed with a solution of 12.8 gms. of $(NH_4)_2Cr_2O_7$. The slurry was neutralized with $NH_4OH$ and filtered on a Buchner funnel. The precipitate was dried at 110° C. and ignited to form copper chromite. The ratio of copper oxide to chromic oxide was about 84:15.3. Catalytic test results with this compound are given in Table I.

EXAMPLE IV 63 gms. of $MgCl_2 \cdot 6H_2O$ and 32 gms. of $Cu(NO_3)_2 \cdot 3H_2O$ were dissolved in water. To this was added a solution of 3.2 gms. $(NH_4)_2Cr_2O_7$ in water. A precipitate formed immediately, and the slurry was neutralized with ammonium hydroxide and filtered on a Buchner funnel. The precipitate was dried at 110° C. and ignited in a crucible to form copper-magnesium chromite. Catalytic test results with this product are given in Table I.

EXAMPLE V

In 500 cc. water were dissolved 67.33 gms.

$$Fe(NO_3)_3 \cdot 9H_2O$$

Ferric hydroxide was precipitated with $NH_4OH$ and a solution of 50 gms. $CrO_3$ in water was added to the slurry. The soluble chromate was obtained by crystallization after prolonged evaporation. Ferric chromite was obtained by igniting the chromate. Catalytic test results are given in Table I.

Table I shows the effect of the catalysts prepared according to Examples I through V on the burning rate and the pressure exponent of a propellant composition comprising 12.5% polyvinyl chloride, 12.5% dibutyl sebacate and 75% ammonium perchlorate. Test results with a commercial copper chromite comprising 84% copper oxide and 15.3% chromic oxide are also given.

*Table I*

| Catalyst | Concentration, percent | Burning rate at 1,000 p.s.i.a. (in./sec.) | Increase in burning rate, percent | Pressure exponent at 1,000 p.s.i.a. |
| --- | --- | --- | --- | --- |
| None | | 0.434 | | 0.42 |
| Ammonium copper chromate | 1 | 0.533 | 23 | 0.402 |
| Leached neutral copper chromite, 1:1 | 1 | 0.546 | 26 | 0.381 |
| Unleached neutral copper chromite 1:1 | 1 | 0.568 | 31 | 0.371 |
| Copper-cadmium-zinc chromite | 1 | 0.524 | 21 | 0.415 |
| Copper chromite 84:15.3 | 1 | 0.584 | 35 | 0.352 |
| Copper magnesium chromite | 1 | 0.558 | 29 | 0.324 |
| Ferric chromite | 0.25 | 0.493 | 14 | 0.39 |
| Ammonium salt of copper-cadmium-zinc chromate | 1 | 0.509 | 17 | 0.42 |
| Cu 0202 [1] | 1 | 0.572 | 32 | 0.354 |
| Cu 0202 [1] | 0.25 | 0.54 | 24 | |

[1] Commercial copper chromite having copper oxide to chromic oxide ratio of 84:15.3.

Table II sets out the effect of a commercial copper chromite comprising 84% copper oxide and 15.3% chromic oxide on burning rate and pressure exponent when added in varying amounts. The propellant compositions employed comprised ammonium perchlorate, polyvinyl chloride and plasticizer, the latter two components being present in equal amounts. The particle size of the oxidizer was varied as shown. Results obtained with the use of potassium perchlorate as the oxidizer are also given. It will be seen that whereas the copper chromite catalyst is exceedingly effective when the oxidizer is ammonium perchlorate, it is inactive and even inhibiting in the case of potassium perchlorate. The plasticizer employed in these tests was dibutyl sebacate.

Table II

| Ammonium perchlorate | | Copper chromite added, percent | Burning rate at 1,000 p.s.i.a., in./sec. | Increase in burning rate, percent | Pressure exponent at 1,000 p.s.i.a. |
|---|---|---|---|---|---|
| Concentration, percent | Approx. particle size,[1] microns | | | | |
| 75.0 | 60 | none | 0.434 | ---- | 0.42 |
| | | 0.05 | 0.485 | 12 | 0.41 |
| | | 0.10 | 0.505 | 16 | 0.37 |
| | | 0.20 | 0.542 | 25 | 0.37 |
| | | 0.50 | 0.554 | 28 | 0.37 |
| | | 1.00 | 0.573 | 32 | 0.36 |
| | | 1.50 | 0.601 | 38 | 0.38 |
| | | 2.00 | 0.630 | 45 | 0.38 |
| | | 3.00 | 0.613 | 41 | 0.36 |
| 77.5 | 60 | none | 0.48 | ---- | 0.43 |
| | | 1.00 | 0.62 | 29 | 0.36 |
| 80.0 | 60 | none | 0.52 | ---- | 0.47 |
| | | 0.05 | 0.58 | 12 | 0.41 |
| | | 0.08 | 0.59 | 13 | 0.41 |
| | | 0.14 | 0.61 | 17 | 0.39 |
| | | 0.20 | 0.63 | 21 | 0.39 |
| | | 0.60 | 0.69 | 33 | 0.37 |
| | | 1.00 | 0.70 | 35 | 0.38 |
| 75.0 | 23 | none | 0.54 | ---- | 0.48 |
| | | 0.10 | 0.641 | 19 | 0.38 |
| | | 0.20 | 0.692 | 28 | 0.38 |
| | | 0.50 | 0.721 | 34 | 0.38 |
| | | 1.00 | 0.748 | 39 | 0.41 |
| 75.0 | 133 | none | 0.38 | ---- | 0.45 |
| | | 0.02 | 0.387 | 2 | 0.39 |
| | | 0.05 | 0.422 | 11 | 0.40 |
| | | 0.14 | 0.448 | 18 | 0.37 |
| | | 0.20 | 0.438 | 15 | 0.39 |
| | | 0.50 | 0.460 | 21 | 0.38 |
| | | 0.95 | 0.478 | 26 | 0.38 |
| | | 1.00 | 0.492 | 29 | 0.38 |
| 70.0 | 60 | none | 0.315 | ---- | 0.60 |
| | | 0.10 | 0.380 | 17 | 0.32 |
| 65.0 | 60 | none | 0.213 | ---- | 0.64 |
| | | 0.10 | 0.267 | 25 | 0.21 |
| | | 1.00 | 0.330 | 55 | 0.37 |
| 60.0 | 60 | none | 0.128 | ---- | 0.64 |
| | | 0.10 | 0.165 | 29 | 0.31 |
| | | 1.00 | 0.222 | 73 | 0.41 |
| Potassium perchlorate | | | | | |
| 80.0 | (2) | none | 0.98 | ---- | 0.70 |
| | | 0.10 | 0.98 | 0 | 0.69 |
| | | 0.50 | 0.98 | 0 | 0.63 |
| 70.0 | (2) | none | 0.70 | ---- | 0.85 |
| | | 0.50 | 0.66 | −6 | 0.76 |

[1] Weight-average particle size = $\frac{\int D\,dW}{\int dW}$ where W is the weight fraction of ground oxidizer of particle size less than D.

[2] Ground at 6900 r.p.m. in Mikro-Pulverizer.

We have found that the particular character of the plasticizer does not appear to affect activity of the catalysts. In other words, the catalysts are similarly effective whether the plasticizer is dibutyl sebacate or any of the other plasticizers aforementioned.

We have disclosed a number of examples and embodiments which are illustrative of our invention. However, it will be obvious to those skilled in the art that our invention encompasses a considerable number of variations within the scope of our claims.

We claim:
1. A propellant composition essentially comprising polyvinyl chloride, an organic plasticizer characterized by its ability to dissolve the resin at a slow rate at ordinary temperatures and rapidly at elevated temperatures, a major proportion of ammonium perchlorate and a minor proportion of catalyst selected from the group consisting of chromate and chromite of a metal selected from the group consisting of copper, iron, zinc, cadmium and magnesium, said catalyst being present in an amount which increases the burning rate of the propellant composition.

2. A propellant composition essentially comprising polyvinyl chloride, an organic plasticizer characterized by its ability to dissolve the resin at a slow rate at ordinary temperatures and rapidly at elevated temperatures, a major proportion of ammonium perchlorate and a minor proportion of catalyst comprising copper chromite, said catalyst being present in an amount which increases the burning rate of the propellant composition.

3. A propellant composition essentially comprising polyvinyl chloride, an organic plasticizer characterized by its ability to dissolve the resin at a slow rate at ordinary temperatures and rapidly at elevated temperatures, a major proportion of ammonium perchlorate and a catalyst comprising copper chromite in an amount up to about 2 percent.

4. A propellant composition essentially comprising a major proportion of ammonium perchlorate and a minor proportion of a catalyst selected from the group consisting of chromate and chromite of a metal selected from the group consisting of copper, iron, zinc, cadmium and magnesium, dispersed in a solid, rubbery gel, said gel comprising a homogeneous dispersion of polyvinyl chloride resin in organic plasticizer, the plasticizer being characterized by its ability to dissolve the resin at a very slow rate at room temperature and rapidly at elevated temperatures, said catalyst being present in an amount which increases the burning rate of the propellant composition.

5. A propellant composition essentially comprising a major proportion of ammonium perchlorate and a minor proportion of a catalyst comprising copper chromite, dispersed in a solid, rubbery gel, said gel comprising a homogeneous dispersion of polyvinyl chloride resin in organic plasticizer, the plasticizer being characterized by its ability to dissolve the resin at a very slow rate at room temperature and rapidly at elevated temperatures, said catalyst being present in an amount which increases the burning rate of the propellant composition.

6. A propellant composition essentially comprising a major proportion of ammonium perchlorate and copper chromite in an amount up to about 2%, dispersed in a solid, rubbery gel, said gel comprising a homogeneous dispersion of polyvinyl chloride resin in organic plasticizer, the plasticizer being characterized by its ability to dissolve the resin at a very slow rate at room temperature and rapidly at elevated temperatures.

7. A propellant composition essentially comprising polyvinyl chloride, an organic plasticizer characterized by its ability to dissolve the resin at a slow rate at ordinary temperatures and rapidly at elevated temperatures, a major proportion of ammonium perchlorate and a minor proportion of a catalyst comprising copper magnesium chromite, said catalyst being present in an amount which increases the burning rate of the propellant composition.

8. A propellant composition essentially comprising a major proportion of ammonium perchlorate and a minor proportion of a catalyst comprising copper magnesium chromite, dispersed in a solid, rubbery gel, said gel comprising a homogeneous dispersion of polyvinyl chloride resin in organic plasticizer, the plasticizer being characterized by its ability to dissolve the resin at a very slow rate at room temperature and rapidly at elevated temperatures, said catalyst being present in an amount which increases the burning rate of the propellant composition.

References Cited in the file of this patent

UNITED STATES PATENTS

| 1,929,453 | Semon | Oct. 10, 1933 |
| 2,067,213 | Snelling | Jan. 12, 1937 |
| 2,479,470 | Carr | Aug. 16, 1949 |
| 2,637,274 | Taylor et al. | May 5, 1953 |
| 2,673,193 | Kolvoort | Mar. 23, 1954 |

FOREIGN PATENTS

| 655,585 | Great Britain | July 25, 1951 |